United States Patent [19]

Rocca et al.

[11] Patent Number: 5,042,240
[45] Date of Patent: Aug. 27, 1991

[54] RECOVERY APPARATUS

[76] Inventors: Earl R. Rocca, 5342 W. Dakota Ave.; Randal L. Rocca, 5378 W. Dakota Ave., both of Fresno, Calif. 93722

[21] Appl. No.: 426,855

[22] Filed: Oct. 26, 1989

[51] Int. Cl.$^5$ ............................................. A01D 61/00
[52] U.S. Cl. ................................... 56/16.6; 56/328.1; 414/505; 198/516; 198/626.6
[58] Field of Search ................... 56/12.8, 16.5, 16.6, 56/328.1; 460/100, 103; 414/505; 198/516, 522, 626.6

[56] References Cited

U.S. PATENT DOCUMENTS

| 2,471,326 | 5/1949 | Hoyt, Sr. | 56/16.6 X |
| 2,670,863 | 3/1954 | Stanley . | |
| 2,821,314 | 1/1958 | Gibbons et al. . | |
| 2,936,917 | 5/1960 | Musgrave . | |
| 3,162,003 | 12/1964 | Schapansky | 56/16.5 |
| 3,280,995 | 10/1966 | Barkley . | |
| 3,597,905 | 8/1971 | Jarrell | 56/12.8 X |
| 3,606,723 | 9/1971 | Clark . | |
| 3,630,009 | 12/1971 | Ashton | 56/12.8 X |
| 3,698,171 | 10/1972 | Hecht | 56/16.5 X |
| 3,701,241 | 10/1972 | Zuckerman . | |
| 3,762,577 | 10/1973 | Olmo et al. . | |
| 3,795,335 | 3/1974 | Hansen, Jr. . | |
| 3,955,343 | 5/1976 | Tico . | |
| 4,221,665 | 9/1980 | Decker . | |
| 4,262,477 | 4/1981 | Turold | 56/327.1 |
| 4,355,433 | 10/1982 | Dietrich | 15/302 |
| 4,364,222 | 12/1982 | Ramacher | 56/12.8 X |
| 4,382,471 | 5/1983 | Peterson | 56/16.5 X |
| 4,759,680 | 7/1988 | Simpson, III . | |

FOREIGN PATENT DOCUMENTS

| 2421545 | 12/1979 | France | 56/16.6 |
| 1443645 | 7/1976 | United Kingdom | 56/16.5 |

Primary Examiner—Dennis H. Pedder
Attorney, Agent, or Firm—Worrel & Worrel

[57] ABSTRACT

A recovery apparatus having a frame adapted for earth traversing movement along an elongated sheet bearing a crop to recover the crop; a first conveyor mounted on the frame for receiving the sheet and conveying the sheet therealong; a second conveyor mounted on the frame for overlaying the sheet and the crop borne thereby on the first conveyor and moving in a complementary direction to the first conveyor; finger members mounted on the second conveyor to maintain space between the second conveyor and the crop borne by said sheet to feed the sheet and the crop borne thereby along the first conveyor without damage to the crop; a vacuum system borne by the frame for removing extraneous material from the crop; and a mechanism for separating the crop from the sheet.

2 Claims, 5 Drawing Sheets

RECOVERY APPARATUS

BACKGROUND OF THE INVENTION

1. Field of the Invention

The present invention relates to a recovery apparatus and more particularly to an apparatus having particular utility in the collection of a crop borne by an elongated, substantially continuous sheet rested on the earth's surface operable automatically to recover the crop from the sheet and condition it in such a fashion during such recovery as to be suitable for packing without further processing.

2. Description of the Prior Art

The mechanization of agriculture under the impetus of dramatic increases in the cost of manual labor has produced a wide variety of devices directed to specific tasks. Labor intensive agricultural operations have, accordingly, been a particular focus of attention for such mechanization. Certain agricultural operations, however, have been plagued with problems inherent in the nature of the operation performed.

For example, the field drying of grapes to form raisins has traditionally been a highly manual labor intensive operation which has presented enduring obstacles to mechanization. Traditionally, the grapes are harvested by hand, placed on individual paper trays, laid on the ground and exposed to ambient sunlight and heat for the period of time required to dry the grapes to form raisins. Once the raisins are formed, the trays are in some cases rolled to cure the raisins therewithin. Finally, the trays are unrolled and the contents deposited in boxes which are then transported from the field. All of these operations require large crews of field workers, and thus, because of the cost of such manual labor, these operations have been the focus of attention for mechanization.

However, certain conditions associated with the field drying of grapes to form raisins present acute problems to such mechanization. Since the trays are laid on the earth's surface for rather extensive periods of time, extraneous material such as dirt, dust, leaves, rocks and other trash become intermixed with the raisins. Compounding this problem is the fact that the very process of drying the grapes to form raisins causes natural sugars to be released onto the tray forming a natural adhesive attractant to such extraneous materials. This also causes the raisins to adhere to the tray.

The present state of technological development includes a variety of approaches, many of which include the use of a substantially continuous sheet of paper or composite material which extends substantially the entire length of the path between adjoining rows of grapevines in the vineyard. The grapes are, by various means, cut from the vines and deposited on the sheet for drying. Various devices have been developed for collecting the raisins once formed on the sheet after drying. For example, the Olmo et al. U.S. Pat. No. 3,762,577 is directed to one such device. The device has a carriage which advances along the sheet to pick up the end of the sheet and tension it as the carriage advances. The raisins are brushed from the sheet into a receiver for collection.

Notwithstanding efforts toward mechanization, prior art devices continue to be plagued by a wide variety of difficulties. These include damaging the crop, picking up extraneous material during the recovery operation, an inability to separate extraneous material from the crop, tearing of the sheet during attempts to feed the sheet through the device, jamming of the sheet within the device, inadequate separation of the crop from the sheet and a host of similar problems resulting from the conditions within which such devices must operate. Furthermore, because of these difficulties, more manpower is required than would be desired to keep the device operating.

Therefore, it has long been known that it would be desirable to have a recovery apparatus capable of recovering crops from a tray rested on the earth's surface without picking up additional extraneous material in the process, with the capability of separating extraneous material from the crop, which can dependably remove substantially all of the crop from the sheet, which is not afflicted with the propensity to tear the sheet or to jam, and which can be operated dependably and efficiently by a single operator to perform its associated functions.

SUMMARY OF THE INVENTION

Therefore, it is an object of the present invention to provide an improved recovery apparatus operable to collect a crop from a substantially continuous sheet of material rested on the earth's surface.

Another object is to provide such an apparatus which can be operated by a single individual to pick up a leading edge of the sheet from the earth's surface, thread the sheet through the apparatus along a predefined course, and remove substantially all of the crop from the sheet for collection substantially all without manual assistance.

Another object is to provide such an apparatus which operates automatically to pick up and feed a sheet bearing a crop through the apparatus for removal of the crop from the sheet without damage to the crop.

Another object is to provide such an apparatus which is particularly well suited to the recovery of raisins from an elongated, substantially continuous sheet rested on the earth's surface without the problems inherent conventionally in the recovery of such a crop, such as the adhesive effect of naturally occurring sugars produced during the drying operation, the presence of extraneous material such as dirt, dust, leaves and other trash and without tearing or jamming due to the fragile nature of the sheet even as may be experienced when the crop and sheet have been subjected to rainfall and may have been saturated producing a deterioration of the sheet.

Another object is to provide such an apparatus which operates dependably after retrieving of the sheet to remove extraneous materials from crop during the recovery operation and before collection in a receptacle so that the crop is substantially ready for packing without further processing.

Another object is to provide such an apparatus which affords the capability of cleaning the operative components thereof in a fully mechanized operation and incident to the interval of time between the completion of recovery in one row and the beginning of recovery in the next row.

Further objects and advantages are to provide improved elements and arrangements thereof in an apparatus for the purposes described which is dependable, economical, durable and fully effective in accomplishing its intended purposes.

These and other objects and advantages are achieved in the recovery apparatus of the present invention which, in the preferred embodiment, employs a frame adapted for earth traversing movement along the elongated sheet bearing the crop, a first conveyor mounted on the frame for receiving the sheet and conveying the sheet therealong, a second conveyor overlaying the first conveyor and having a multiplicity of fingers for maintaining space between the first and second conveyors to protect the crop borne by the sheet passing therebetween while feeding the sheet therealong, a vacuum system mounted on the apparatus for vacuumatically removing extraneous material from the crop, a screen conveyor for transporting the crop in such a fashion as gravitationally to release extraneous material therefrom and a fluid applying system operable selectively to cleanse operative portions of the apparatus between recovery cycles.

DESCRIPTION OF THE PREFERRED EMBODIMENT

Figure 1:
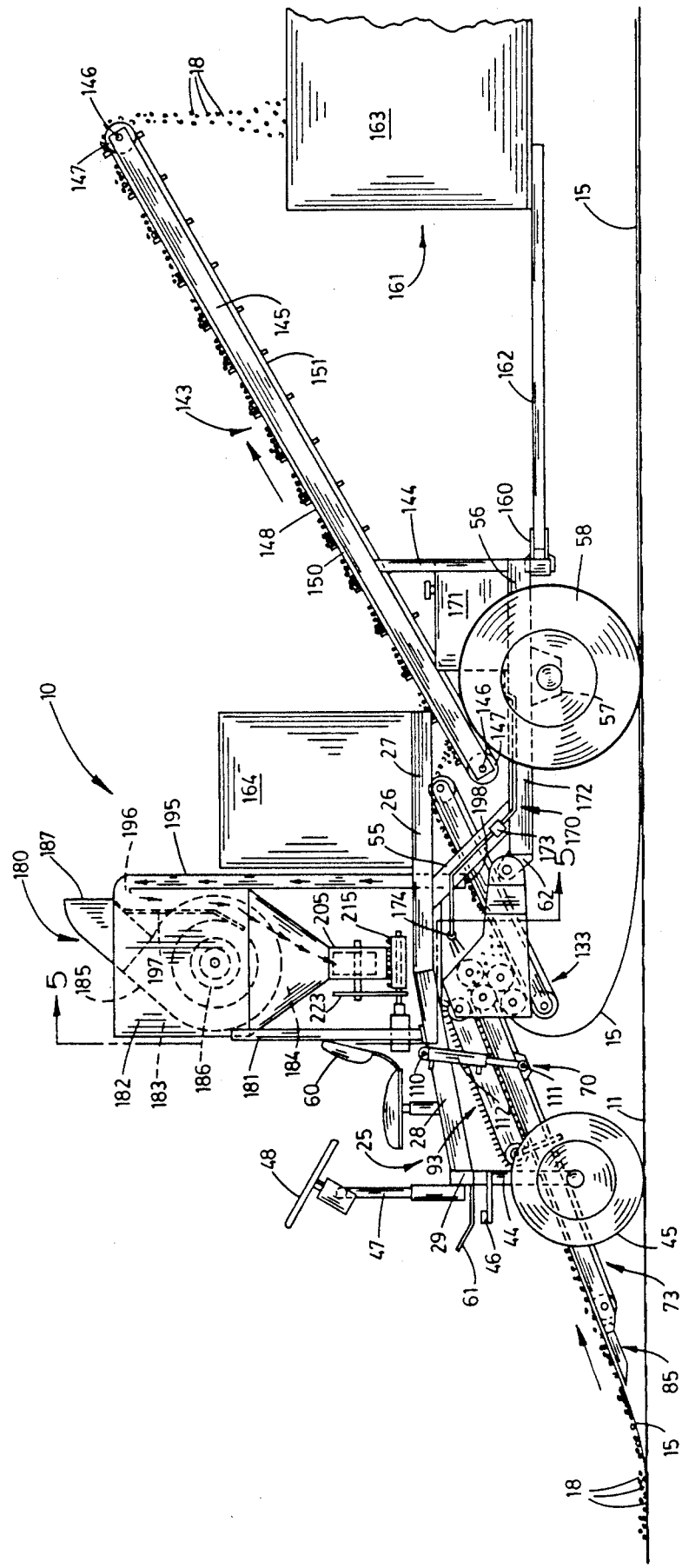
FIG. 1 is a side elevation of the recovery apparatus of the present invention shown in a typical operative environment recovering a crop borne by a substantially con sheet and rested on the earth's surface.

Referring more particularly to the drawings, the recovery apparatus of the present invention is generally indicated by the numeral 10 in FIG. 1. The apparatus of the present invention can be employed in the recovery of a wide variety of types of crops, but is particularly well suited to the recovery of raisins formed by exposure to ambient sunlight and heat on a substantially continuous tray. Thus, for illustrative convenience, the apparatus is shown and described herein in the recovery of such a crop.

As shown in FIG. 1, the apparatus is in such an operative environment in a vineyard wherein the earth's surface is indicated at 11. Grapevines 12 are grown in rows 13. Adjoining rows of grapevines are separated by a path 14. As shown in the drawings, a substantially continuous sheet is rested on the earth's surface. These sheets may be of any suitable type. Conventionally, such sheets are fabricated of paper, plastic or a composite material. For example, in some instances, the sheet is of a paper material having an upper surface which is provided with a coating resistant to adhesion. In any case, it will be understood that, in accordance with conventional practices, the sheet is reeled from a roll of such material down the path 14 between the rows 13 of grapevines 12 for substantially the entire length of the path. The sheet has a lower surface and an opposite upper surface 17. As shown in the drawings, raisins 18 are rested on the upper surface of the sheet.

The recovery apparatus has a main frame 25 including a pair of substantially parallel main beams 26 individually extending along the lateral edges of the main frame. The main beams have horizontal portions 27 and forward or sloping portions 28. The sloping portions of the main beams are interconnected at the forward most ends thereof by a forward cross beam 29 extending therebetween. Similarly, the rearward ends of the horizontal portions of the main beams are interconnected by a rearward cross beam 30.

A front support frame 40 is mounted on the forward cross beam 29 extending downwardly therefrom. A front wheel beam 41 is mounted on the front support frame by a central bearing assembly 42 allowing limited pivotal movement about a substantially horizontal axis. The front wheel beam 41 has opposite end portions 43 on which are individually affixed wheel mounting assemblies 44. Each of the wheel mounting assemblies mounts a front wheel 45. This permits the front wheels 45 to pivot about a horizontal axis defined by central bearing assembly 42 in such a manner as to permit the apparatus to follow variations in terrain. A steering assembly 46 operably interconnects the front wheel mounting assemblies 44 and is operable to permit the front wheels 45 to be steered through positions of parallelism. A steering column 47 is mounted on the forward cross beam 29 and is operably connected to the steering assembly 46 through a linkage, not shown. A steering wheel 48 is borne by the steering column and is operable to permit steering of the front wheels 45 through the steering assembly 46 and steering column 47.

The main frame 25 has a pair of lower support beams 55 extending downwardly from the horizontal portions 27 of the main beams 26 and mounting, at the lower ends thereof, lower horizontal beams 56. A rear axle assembly 57 interconnects the lower horizontal beams 56 extending transversely thereof and mounting rear wheels 58 at the opposite ends thereof for rolling ground engagement.

A floor 59 is mounted on the sloping portions 28 of the main beams 26. A driver's seat 60 is mounted on the floor in upstanding relation facing the steering wheel 48. A foot platform 61 is mounted on the forward crossbeam 29 extending forwardly thereof. A pair of subframe mounts 62 are individually mounted on the lower horizontal beams 56 beneath the lower support beams 55, as best shown in FIGS. 1 and 4.

Figure 4:
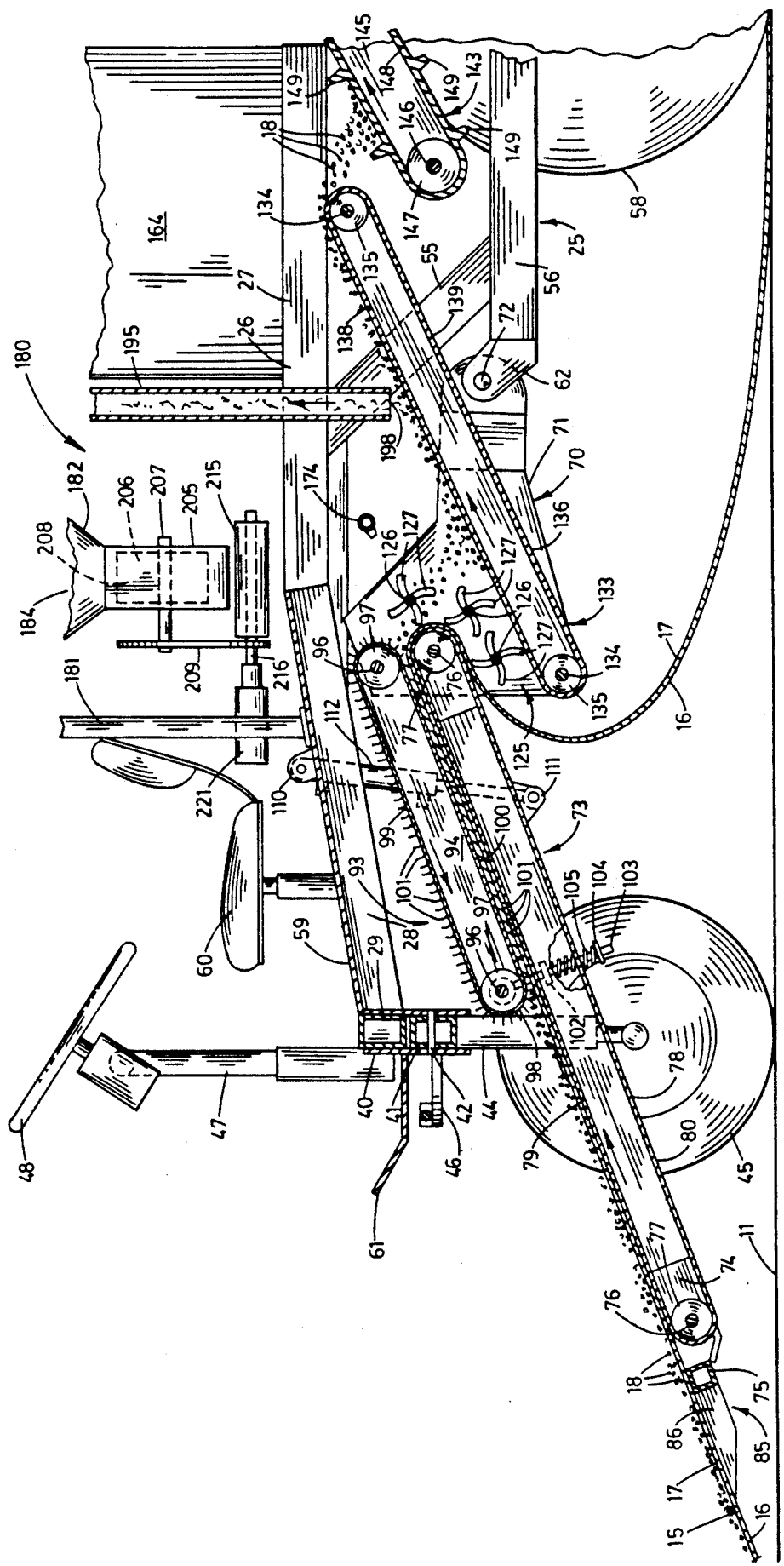
FIG. 4 is a somewhat enlarged, fragmentary, longitudinal vertical section taken on line 4—4 in FIG. 3.

A subframe 70 is mounted on the main frame 25 beneath the sloping portions 28 thereof, as best shown in FIGS. 1 and 4. The subframe includes a pair of substantially parallel main plates 71 which are individually mounted on the subframe mount 62 by a pivot shaft 72. A first conveyor assembly 73 is mounted on and interconnects the main plates 71 of the subframe 70 extending forwardly therefrom, as best shown in FIG. 4. The first conveyor assembly 73 includes a pair of first conveyor beams 74 individually mounted on the main plates 71 extending forwardly thereof and sloping downwardly in substantially parallel relation. The remote ends of the first conveyor beams are interconnected by a forward cross beam 75. The first conveyor beams are interconnected by a pair of first conveyor shafts 76 extending therebetween in spaced, substantially parallel relation. The shafts 76 are individually journaled in bearings, not shown, borne by the first conveyor beams for rotational movement therewithin. Rollers 77 are individually mounted on the first conveyor shafts for rotational movement therewith. A first conveyor belt 78 is operably extended about the rollers 77 for rotational movement therewith. The first conveyor belt has an upper run 79 and a lower run 80. It will be seen that the first conveyor assembly 73 is pivotal about the first conveyor shaft 76 on the right as viewed in FIG. 4 with the first conveyor beam 74 thereof.

Figure 2:
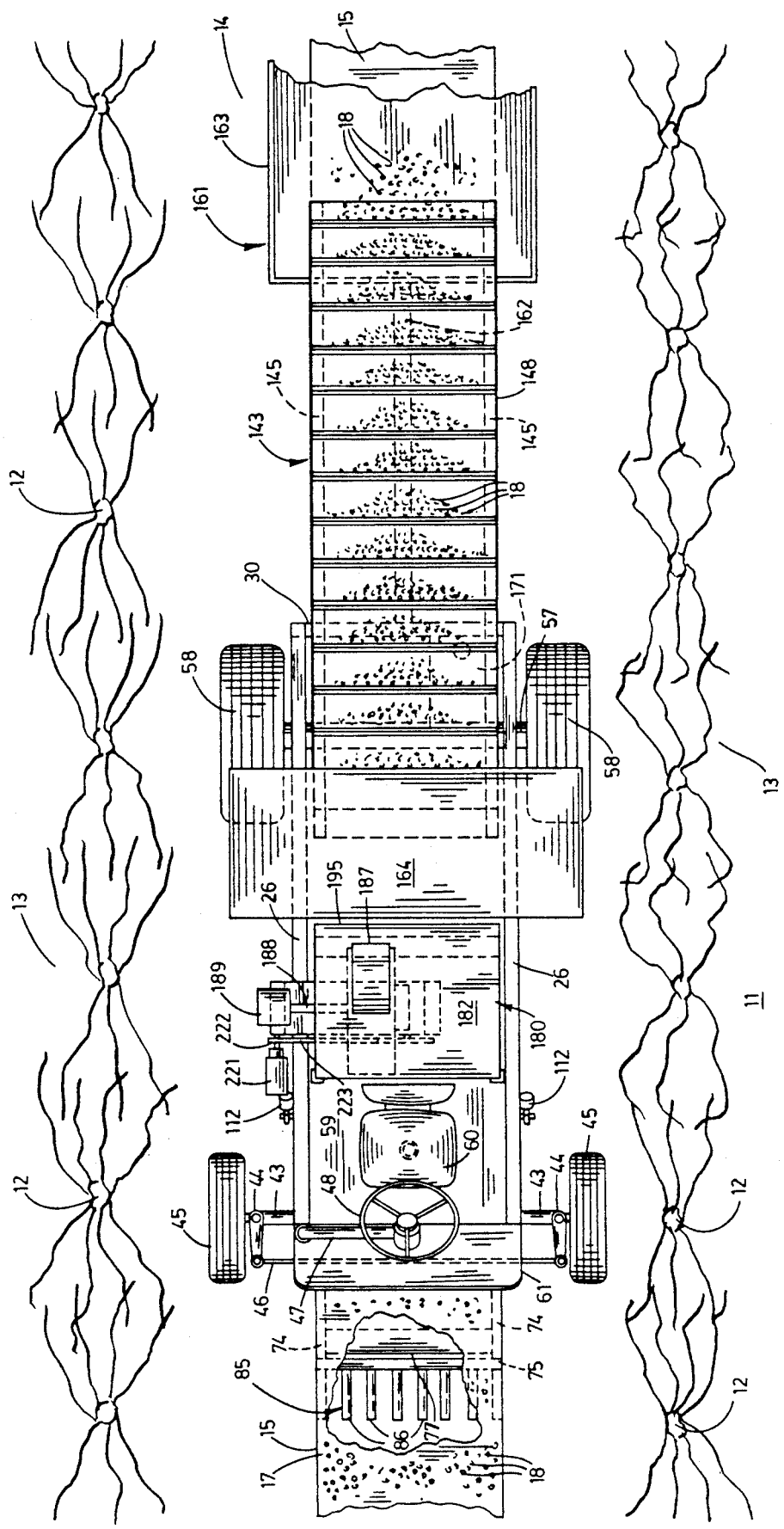
FIG. 2 is a fragmentary top plan view of the recovery apparatus of FIG. 1.
Figure 3:
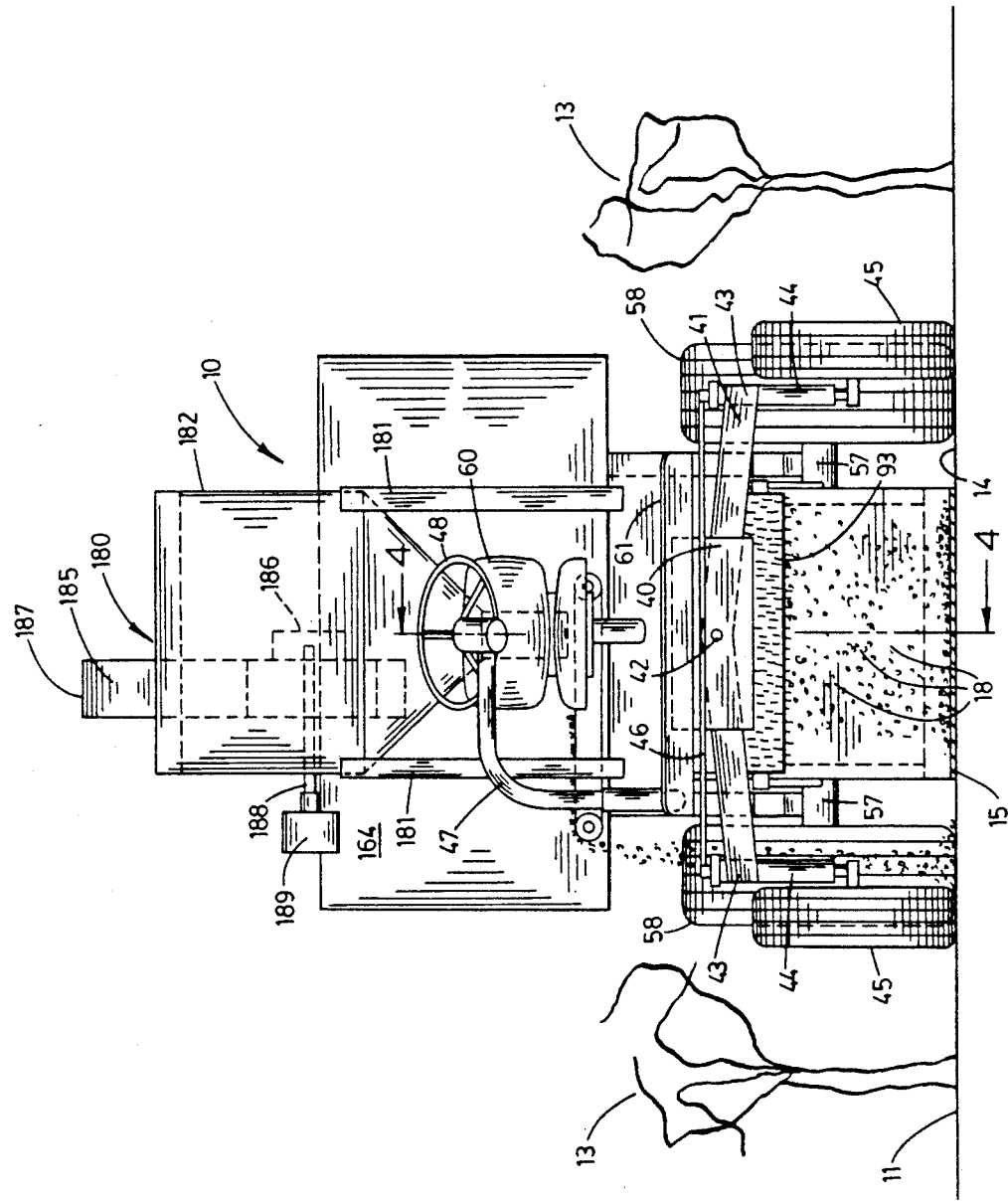
FIG. 3 is a front elevation of the apparatus of FIG. 1.

A fork assembly 85 is mounted on the forward cross beam 75 extending downwardly and forwardly therefrom. The fork assembly includes a plurality of spaced, substantially parallel forks 86, best shown in FIG. 2.

A second conveyor assembly 93 is mounted on and interconnects the main plate 71 of subframe 70. The second conveyor includes a pair of second conveyor beams 94 individually pivotally mounted on the main plates and extending forwardly therefrom in overlaying relation to the first conveyor beam 74. The second conveyor beams are individually interconnected by second conveyor shafts 96 extending therebetween in spaced substantially parallel relation. The shafts 96 are individually journaled in bearings, not shown, borne by the second conveyor beams 94 for rotational movement therewithin. The shafts 96 individually mount rollers 97 for rotation therewith. A second conveyor belt 98 is entrained about the rollers 97 for rotation thereabout. The second conveyor belt has an upper run 99 and a lower run 100. The second conveyor belt has a multiplicity of flexible fingers 101 formed thereon and extending outwardly therefrom. A bracket 102 is individually mounted on each of the second conveyor beams 94 extending laterally thereof. A rod 103 is pivotally mounted on the forward most second conveyor shaft 96, at each end thereof, above its respective bracket 102 and extends slidably through its respective bracket. A spring flange 104 is mounted on the lower most end portion of each rod 103. A compression spring 105 is received on each rod captured between the spring flange 104 and the bracket 102 thereof. Thus, it will be seen that the second conveyor assembly 93 is pivotal about the uppermost second conveyor shaft 96 as restrained by the compression springs 105. Thus, the second conveyor assembly is resiliently retained with the fingers 101 thereof in flexible engagement with the upper run 79 of the first conveyor belts 78.

An upper hydraulic cylinder mount 110 is mounted, as by welding, on the sloping portion 28 of the main beam 26 on each side of the main frame 25 of the apparatus 10. A lower hydraulic cylinder mount 111 is mounted, as by welding, on the first conveyor beam 74 on each side of the first conveyor assembly 73 in the position shown, relative to its respective upper hydraulic cylinder mount, in FIG. 4. Corresponding upper and lower hydraulic cylinder mounts are interconnected by an hydraulic cylinder assembly 112. The hydraulic cylinder assemblies 112 are operable, through a suitable hydraulic system not shown, to permit moving of the first conveyor assembly 73 and of the second conveyor assembly 93 borne thereby between a lowered position in which the forks 86 of the fork assembly 85 are rested on or slightly penetrating the earth's surface and any selected position pivoted upwardly therefrom, as, of course, limited by the main frame 25 thereabove. As will subsequently be discussed in greater detail, the normal operational position for the first conveyor assembly and second conveyor assembly is substantially as shown in FIG. 4.

A sheet directing assembly 125 is mounted on the subframe 70 extending between the main plates 71 thereof. The sheet directing assembly includes three shafts 126 rotationally received in bearings, not shown, so as to extend in positions of parallelism between the main plates parallel to the first conveyor shaft 76 at the upper end of the first conveyor assembly 73. Each of the shafts 126 mounts a plurality of radiating flexible members 127 which, during rotation, contact the first conveyor belt 78. The shafts, and thus, the radiating flexible members 127 are rotated in counterclockwise directions, as viewed in FIG. 4.

The apparatus 10 has a third conveyor assembly 133 best shown in FIG. 4. A third conveyor assembly has a pair of third conveyor shafts 134 mounted in spaced substantially parallel relation on the apparatus. The lower most third conveyor shaft is mounted in suitable bearings, not shown, individually borne by the main plates 71 of the subframe 70 extending therebetween beneath the sheet directing assembly 125. The upper third conveyor shaft is journaled in bearings, not shown, individually mounted on the horizontal portions 27 of the main beams 26. Rollers 135 are individually mounted on the third conveyor shafts for rotation therewith. A third conveyor belt 136 is entrained about the rollers 135 for rotation therewith. The third conveyor belt is preferably a screen belt of a gauge which is sufficiently small to carry raisins therealong but which is sufficiently porus to allow extraneous material such as sand, dirt and small particle trash to fall therethrough by gravity. The conveyor belt has an upper run 138 and a lower run 139. The third conveyor belt is adapted to be driven in a clockwise direction as viewed in FIG. 4.

A fourth conveyor assembly 143 is mounted on the main frame 25 of the apparatus 10 in trailing relation to the third conveyor assembly 133, as best shown in FIG. 1. The fourth conveyor assembly includes a support frame 144 mounted in upright relation on the rearward cross beam 30 of the main frame 25. The support frame, in turn, mounts a pair of fourth conveyor beams 145 disposed at an angle so as to extend upwardly and rearwardly from a position in receiving relation to the upper end of the third conveyor assembly to appoint elevated and rearward of the rearward cross beam 30. Fourth conveyor shafts 146 are journaled in suitable bearings, not shown, adjacent to the opposite ends of the fourth conveyor beams for rotational movement. Rollers 147 are individually mounted on the fourth conveyor shafts for rotation therewith. A fourth conveyor belt 148 is entrained about the rollers 147 for rotational movement therewith in a clockwise direction as viewed in FIG. 1. The fourth conveyor belt has upwardly extending ridges or flights 149 in spaced, substantially parallel relation therealong. The fourth conveyor belt has an upper run 150 and a lower run 151.

Referring more particularly to FIG. 1, the apparatus 10 has a trailer hitch 160 mounted on and beneath the rearward cross beam 30. The apparatus is adapted to pull a trailer 161 of any conventional type in trailing relation thereto. The trailer 161 has a tongue 162 adapted releasably for attachment to the trailer hitch and a bin or receptacle 163 such as conventionally used for receiving raisins as they are collected after field drying.

The apparatus 10, in the preferred embodiment, is adapted to be self-propelled. In this regard, the apparatus has an engine compartment 164 mounted on the horizontal portions 27 of the main beams 26 housing portions of the operative equipment therefore. Operably extended from the engine compartment are suitable drive systems for powering the various powered systems of the apparatus including the first conveyor assembly 73, second conveyor assembly 93, hydraulic cylinder assemblies 112, sheet directing assembly 125, third conveyor assembly 133, fourth conveyor assembly 143, fluid applying system 170, vacuum system 180 and discharge conveyor assembly 215. The drive systems can be, as appropriate, mechanical, hydraulic and/or electric.

A fluid applying system 170 is borne by the main frame 25. The fluid applying system includes a fluid tank 171 which is mounted on the horizontal portions 27 of the main beams 26, as can best be seen in FIG. 1. A fluid conduit 172 having a fluid pump 173 therein extends operationally from the fluid tank forwardly on the main frame 25 and mounts in an array of spray nozzles 174 at the terminal end thereof in juxtaposition to the sheet directing assembly 125, as can best be seen in FIG. 4. The fluid applying system is operated through a control system, not shown, including a start switch and timer for controlling the length of operation of the fluid pump. Thus, when the start switch is triggered, the timer operates for a preselected period of time to, in turn, activate the fluid pump. The fluid pump operates to pump a suitable fluid, such as water, from the fluid tank along the fluid conduit and to discharge the fluid from the spray nozzles onto the sheet directing assembly 125 for purposes hereinafter to be described.

Figure 5:
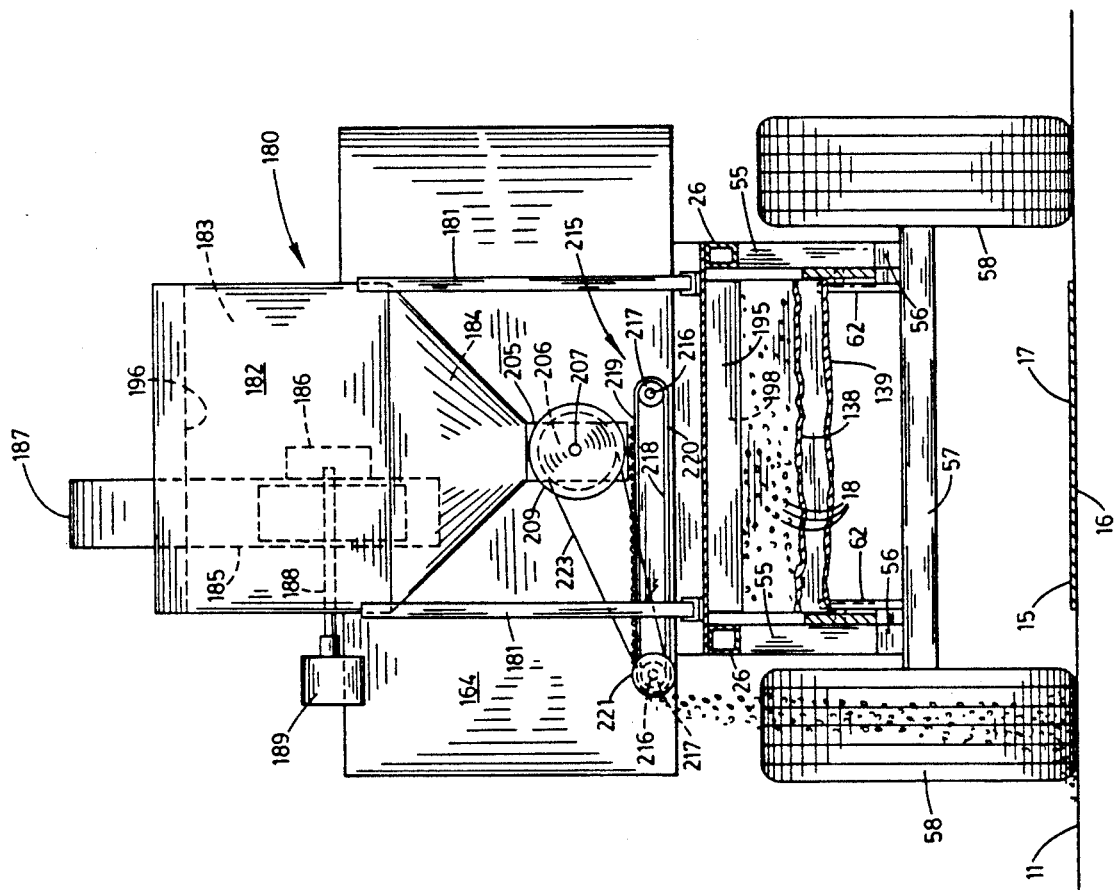
FIG. 5 is a somewhat enlarged, transverse vertical section taken on line 5—5 in FIG. 1.

The apparatus 10 has a vacuum system 180 which can perhaps best be seen in FIGS. 1 and 5. The vacuum system includes a support frame 181 mounted on the main beams 26 of the main frame 25 in upstanding relation. A air housing 182 is mounted on the support frame and constitutes, except as otherwise set forth herein, a substantially airtight housing. The housing encloses an air chamber 183 and a lower downwardly convergent collection chamber 184 which constitutes an operable part of the air chamber. A blower unit 185 is mounted within the air chamber of the air housing having an air inlet 186 within the air chamber and an air exhaust 187 externally of the air housing. The blower unit is of a conventional type having an internal fan, not shown, which draws air inwardly of the blower unit through the air inlet and exhausts the air so collected through the air exhaust. A drive shaft 188 operably extends from the blower unit through the wall of the air housing to a drive motor 189 operable to rotate the shaft and thereby the fan within the blower unit. Accordingly, operation of the drive motor drives the blower unit to remove air from within the air chamber 183 of the air housing and expel it from the air housing through the air exhaust 187.

The vacuum system 180 has a vacuum conduit 195 communicating with the air chamber 183 of the air housing through a vacuum inlet 196 at the top thereof. An air baffle 197 is mounted within the air chamber and extends downwardly to a point just beyond the air inlet 186 of the blower unit 185 extending in the direction of the collection chamber 184. The vacuum conduit has a vacuum inlet 198 which, as can best be seen in FIG. 4, is positioned immediately above the upper run 138 of the third conveyor belt 136. Thus, operation of the blower unit 185 causes a low pressure area to be formed within the air chamber 183 to establish a path of air movement inwardly through the vacuum inlet 198, upwardly through the vacuum conduit 195, into the air chamber 183 through the vacuum inlet 196 and downwardly against the air baffle 197 in the direction of the collection chamber 184.

A discharge housing 205 is mounted on the lower end of the air housing 182 in connection with the collection chamber 184 thereof. The discharge housing encloses an airlock 206. An airlock shaft 207 is rotationally mounted in the discharge housing extending through the airlock. The airlock shaft mounts a plurality of airlock blades 208 which at their upper ends pass into substantially sealing engagement with the collection chamber 184 of the air chamber 183. The airlock blades radially extend from the shaft to define compartments between adjoining blades adapted to receive material collected within the collection chamber as the compartments pass into communication therewith. The blades thus operate to form an airlock such that the material can fall gravitationally into the compartment defined by adjoining airlock blades so that substantially no air can bleed into the air chamber through the airlock. An airlock pulley 209 is mounted on the airlock shaft externally of the discharge housing.

A discharge conveyor assembly 205 is mounted, by any suitable means, on the apparatus directly beneath the discharge housing 205. The discharge conveyor assembly includes a pair of discharge conveyor shafts which are journaled for rotational movement in suitable bearings, not shown. The shafts individually mount rollers 217 about which is entrained a discharge conveyor belt 218. The discharge conveyor belt has an upper run 219 and a lower run 220. As shown in FIG. 5, the discharge conveyor assembly extends laterally of the apparatus to the left side of the main frame 25, as shown in FIG. 5. As also viewed in FIG. 5, the discharge conveyor belt 218 is adapted to be rotated in a counterclockwise direction. An hydraulic motor 221 is mounted on the discharge conveyor shaft 216 on the left, as viewed in FIG. 5, in driving relation to the discharge conveyor assembly. A pulley 222 is mounted on the same shaft as the hydraulic motor and is connected in driving relation to the airlock pulley 209 by a pulley belt 223.

OPERATION

The operation of the described embodiment of the present invention is believed to be readily apparent and is briefly summarized at this point.

The recovery apparatus 10 is driven to a position at the leading edge of a sheet at the end of a path 14 between rows 13 of grapevines 12. Using the hydraulic cylinder assemblies 112, the operator lowers the fork assembly 85 into engagement with the earth's surface 11. The apparatus is driven forwardly so that the forks 86 slide beneath the sheet and, due to the weight of the raisins 18 on the sheet, the sheet slides up along the fork assembly and onto the upper run 79 of the first conveyor belt 78 as forward movement of the apparatus is continued. The first conveyor belt 78 at this time is being driven in a clockwise direction, as shown in FIG. 1, so that as forward movement of the apparatus is continued and rotation of the conveyor belt 78 continues, the sheet bearing the raisins progressively moves upwardly along and with the first conveyor belt and then between the lower run 100 of the second conveyor belt 98 and the upper run of the first conveyor belt, as can best be visualized in FIG. 4.

Once the sheet bearing the raisins 18 has advanced to this position, the operator preferably activates the hydraulic cylinder assemblies 112 to raise the first and second conveyor assemblies 73 and 93 approximately to the positions shown in FIG. 4. This raises the forks 86 from engagement with the earth's surface and, since the first and second conveyor assemblies are rotated at a speed somewhat greater than the speed of earth traversing movement of the apparatus, the sheet is tensioned in such a fashion that it pulls upwardly from the earth's surface in advance of the forks of the apparatus as shown in FIG. 1. As the apparatus moves along the sheet, this tension is maintained so that the forks are retained out of engagement with the earth's surface. As a consequence, soil, rock, trash and the like are not picked up by the fork assembly thereby maintaining the raisins in a cleaner condition than has heretofore been possible.

Engagement of the lower run 100 and the fingers 101 thereof with the sheet and the raisins 18 borne thereby, operates not only to tension the sheet in the manner described but similarly to loosen the raisins from the sheet. This has been found particularly effective in view of the adhesive character of the juices produced on the sheet incident to the prior drying operation. Thus, any adhesive attachment between the raisins and the sheet is broken freeing them for subsequent removal. In addition, the fingers operate to retain the second conveyor belt substantially off of the raisins so that they are not mashed or otherwise damaged during passage therebeneath.

As the upper edge of the sheet 15 reaches the uppermost end of the first conveyor belt 78, the sheet is contacted by the radiating flexible members 127 of the sheet directing assembly 125. Since these flexible members are rotated in a counterclockwise direction, as viewed in FIG. 4, the edge of the sheet is folded downwardly and beneath the upper end of the first conveyor belt. Forward movement of the apparatus and rotation of the conveyor belt assemblies is continued so that the leading edge of the sheet moves forwardly and downwardly. Subsequently, the leading edge contacts the earth's surface and, because of the forward movement of the apparatus, is then moved rearwardly, or to the right as viewed in FIG. 4, by engagement with the earth's surface. In this manner, the sheet is automatically threaded through the apparatus without manual assistance and returned to the position on the earth's surface which it occupied prior to contact by the apparatus.

Simultaneously, however, the raisins 18 fall by gravity or are otherwise propelled rearwardly by contact of the fingers 101 therewith. Similarly, the flexible members 127 have some additional benefit, in that any raisins continuing to adhere to the sheet may be removed therefrom by the contact of the flexible fingers 127. The raisins fall gravitationally onto the upper run 138 of the third conveyor belt 136 and are carried upwardly therealong to the right as viewed in FIG. 4. Since the third conveyor belt, as previously described, is a screen belt, extraneous material, such as dirt, sand, rocks and small particle trash are free to fall by gravity through the belt and onto the earth's surface. Furthermore, the natural vibration associated with operation of the apparatus, due to the engine operation, movement of the subsystems thereof and passage over the earth's surface, shakes the upper run of the third conveyor belt to assist in discharging such extraneous material from the raisins therethrough.

As the raisins 18 continue to travel upwardly along the upper run 138 of the third conveyor belt 136, they pass beneath the vacuum inlet 198 of the vacuum conduit 195. The close proximity of the vacuum inlet to the upper run of the conveyor belt, the porus nature of the conveyor belt, and the vacuumatic attraction produced by the vacuum system 180, combine to create a path of air movement upwardly through the upper run 138 of the third conveyor belt and into the vacuum inlet 198. This path of air movement causes the remaining extraneous material, such as dirt, dust, leaf particles, leaves, chaff, substandard raisins and the like to be drawn upwardly in the vacuum conduit 195. The extraneous material is drawn along the path indicated by the arrows in FIG. 1 upwardly through the vacuum conduit 195 through the vacuum inlet 196 downwardly within the air chamber 183 against the air baffle 197 and to gravitationally precipitate from the air stream into the collection chamber 184 within the air housing 182. The air stream itself, having the extraneous material gravitationally removed therefrom, is drawn into the blower unit 185 through the air inlet 186 and is discharged from the air housing 182 through the air exhaust 187.

As the airlock blades 208 are rotated beneath the collection chamber 184 of the air housing 182, the compartments defined between adjoining blades pass into communication with the interior of the air chamber. During such passage, the collected extraneous material falls by gravity into the compartment and is subsequently carried therefrom 180 degrees to a position in which the extraneous material is deposited by gravity on the upper run 219 of the discharge conveyor belt 218. As can best be seen in FIG. 5, the trash is received on the upper run and is transmitted to the left as viewed in FIG. 5 and is discharged from the discharge conveyor belt by gravity onto the earth's surface laterally with respect to the sheet 15. It will be understood that this operation of the vacuum system 180, discharge housing 205 and discharge conveyor assembly 215 is continued for as long as the apparatus is operating to remove such extraneous material from the raisins.

As previously noted, the natural vibrations produced by the apparatus during movement along the sheet causes, in effect, the upper run of the third conveyor belt 136 to shake in a manner somewhat resembling the shaker screens conventionally used in processing raisins once delivered to a packing house. Thus, the combination of the passage of the raisins along the upper run of the third conveyor belt and the operation of the vacuum system 180 effectively cleans the raisins of extraneous material so that no further processing prior to packing is required.

Upon reaching the upper end of the third conveyor assembly 133, the raisins 18 are deposited by gravity on the upper run 150 of the fourth conveyor belt 148. The raisins are captured in the spaces between the flights 149 of the fourth conveyor belt and are thus carried upwardly therealong as can best be visualized in FIGS. 1 and 2. The raisins, upon reaching the upper end of the fourth conveyor assembly 143 are deposited by gravity in the receptacle 163 of the trailer 161 being pulled in trailing relation to the apparatus. This harvesting operation is, of course, continued until the apparatus has traveled the full length of the sheet and recovered the raisins therefrom. As a consequence, all of the raisins originally borne by the sheet are received in the receptacle 163 in a cleaned condition suitable for packing.

Once having traveled the full length of the path 14 and released the trailing edge of the sheet subsequent to removal of the raisins therefrom, the operator drives the apparatus to the next row in which a sheet bears raisins for recovery. During this transition from the end of one sheet to the beginning of the next sheet, the operator presses the switch, not shown, of the fluid applying system 70. This causes the timer, not shown, to operate the fluid pump 173 for a predetermined period of time. The fluid applying system thereby discharges fluid, preferably water, onto the flexible members 127 of the sheet directing assembly 125 between passes down the paths 14 in the recovery process. The release of water onto the flexible members operates to neutralize or dissolve the juices borne by the flexible members. Thus, the potential adhesive effect of the flexible members on the sheet is eliminated. In conventional devices this adhesive effect would cause the sheet to become entangled in the apparatus. The timer, not shown, operates the fluid pump a given period of time and then shuts the fluid pump off so that the flow of water is terminated. Thus, by the time the apparatus is ready to begin movement down a path 14 along a sheet 15, the flexible members of the sheet directing assembly are sufficiently cleansed that the sheet is automatically wound through the apparatus, as heretofore described, during the harvesting operation without requiring any attention by the operator of the apparatus.

This harvesting operation is continued until all of the raisins are recovered or until the receptacle 163 of the trailer 161 is filled. When this latter event occurs, the operator simply detaches the trailer and replaces it with a similar trailer so that the recovery operation can be continued.

Therefore, the recovery apparatus of the present invention is capable of recovering crops from a sheet rested on the earth's surface without damage thereto, without picking up extraneous material in the process, with the capability of separating existing extraneous material from the crop, which can dependably remove substantially all of the crop from the sheet, which is not afflicted with the propensity to tear the sheet or to jam and which can be operated dependably and efficiently by a single operator to perform its associated functions.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. An apparatus for recovering a crop from a substantially continuous sheet rested on the earth surface, the apparatus comprising:
   A. a main frame adapted for earth traversing movement along said sheet in a given direction of movement;
   B. a subframe mounted on the main frame for substantially pivotal movement about a substantially horizontal axis substantially transverse to the sheet;
   C. a first conveyor mounted on the subframe having a lower end portion and sloped upwardly and rearwardly therefrom with respect to said direction of movement to an upper end portion;
   D. a second conveyor mounted on said subframe in overlaying relation to said first conveyor and having a plurality of flexible finger members extended therefrom for engagement with the first conveyor, an upper end portion substantially pivotally mounted on the subframe above said upper end portion of the first conveyor and a lower end portion mounted for movement toward and from the first conveyor;
   E. a shaft mounted on the subframe substantially parallel to a transverse extent of the upper end portion of the first conveyor and having a plurality of members radiating therefrom toward the upper end portion of the first conveyor;
   F. means disposed beneath said upper end portion of the first conveyor for collecting the crop separated from the sheet; and
   G. means for driving the first and second conveyors and the shaft in complementary directions of movement to draw said sheet upwardly on the first conveyor and, under the impetus of said shaft, downwardly about the upper end portion of the first conveyor to release said crop from the sheet onto the collecting means.

2. The apparatus of claim 1 wherein the lower end portion of the second conveyor is resiliently retained in engagement with the first conveyor by a spring operable resiliently to permit movement therefrom to accommodate variations in the depth of the crop passing between said first and second conveyors.

* * * * *

UNITED STATES PATENT AND TRADEMARK OFFICE
CERTIFICATE OF CORRECTION

PATENT NO. : 5,042,240

DATED : August 27, 1991

INVENTOR(S) : Earl R. Rocca; Randal L. Rocca

Page 1 of 2

It is certified that error appears in the above-identified patent and that said Letters Patent is hereby corrected as shown below:

Column 3, Line 21
Delete the word "con"; Insert the word ---continuous---

Column 3, Line 47
Insert the number 15 after the word sheet

Column 5, Line 53
Insert the number 11 after the word surface

Column 8, Line 14
Delete the number "205"; Insert the number ---215---

Column 8, Line 17
Insert the number 216 after the word shafts

Column 8, Line 40
Insert the number 15 after the word sheet

Column 8, Line 58
Insert the number 15 after the word sheet

Column 9, Line 9
Insert the number 15 after the word sheet

Column 9, Line 32
Insert the number 11 after the word surface

UNITED STATES PATENT AND TRADEMARK OFFICE
CERTIFICATE OF CORRECTION

PATENT NO. : 5,042,240

DATED : August 27, 1991

INVENTOR(S) : Earl R. Rocca; Randal L. Rocca

It is certified that error appears in the above-identified patent and that said Letters Patent is hereby corrected as shown below:

Column 10, Line 59

Insert the number 15 after the word sheet.

Signed and Sealed this

Sixth Day of October, 1992

Attest:

DOUGLAS B. COMER

*Attesting Officer*     Acting Commissioner of Patents and Trademarks